United States Patent Office 2,855,278
Patented Oct. 7, 1958

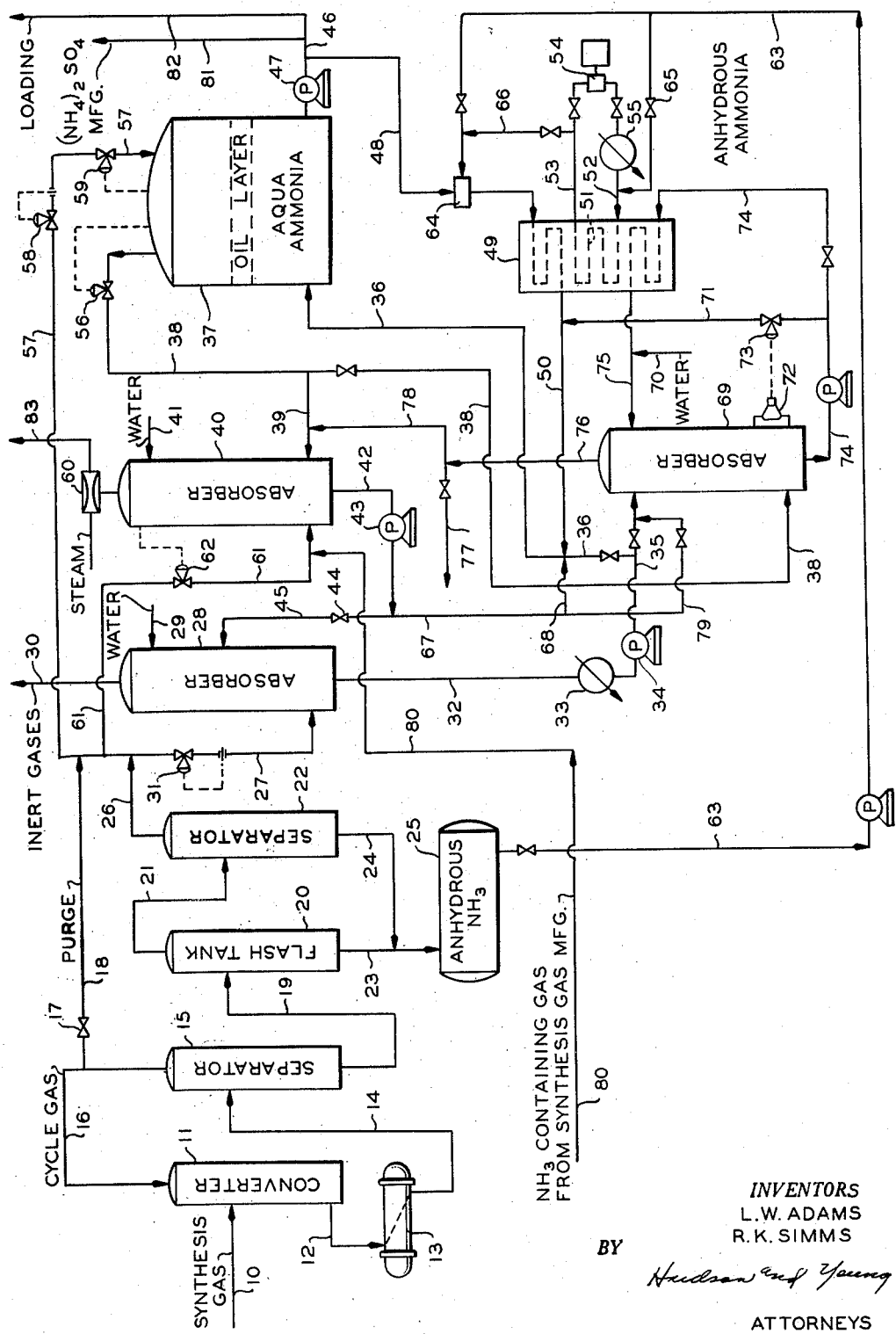

2,855,278

STORAGE OF AMMONIA IN AQUEOUS SOLUTION

Loyd W. Adams and Russell K. Simms, Bartlesville, Okla., assignors to Phillips Petroleum Company, a corporation of Delaware Application April 29, 1955, Serial No. 504,989

17 Claims. (Cl. 23—193)

This invention relates to the storage of ammonia. In one aspect this invention relates to the recovery and storage of ammonia as aqua ammonia. In another aspect this invention relates to an integrated method for the production, recovery and storage of ammonia.

In the production and sale of ammonia there are periods of peak demand and periods of slack demand. In order to most efficiently utilize ammonia producing facilities it is necessary to store the ammonia during the said slack periods in order that it will be available for sale or use during periods of peak demand. Several methods for storing ammonia have been proposed. Ammonia can be stored as liquid ammonia in pressure vessels or spheres. However, this method of storage is expensive where large quantities of ammonia must be stored because it is necessary to supply vessels having sufficient strength to withstand the vapor pressure generated by ammonia at higher atmospheric temperature, for example in the summer time, or provide facilities for withdrawing the vaporous ammonia as it forms, condense the said vapors and return the condensed ammonia to storage. Either method is expensive. It has also been proposed to store ammonia as liquid ammonia in underground caverns. However, this method of storage has the disadvantage that the ammonia frequently dissolves impurities from the cavern walls and must be distilled before it can be used.

Ammonia can also be stored as aqua ammonia. In ammonia producing plants it is customary to scrub various ammonia containing vent gas streams with water to recover the said ammonia. The aqueous solution of ammonia thus formed is then stored temporarily and the ammonia recovered therefrom by distillation. In general, the storage of ammonia as aqua ammonia has the disadvantage that large storage capacity is required; however, storing ammonia as aqua ammonia has the advantage of not requiring high pressure equipment. Prior to our invention if ammonia was stored in aqueous solution in large quantities for any length of time it was necessary, in order to avoid excessive loss of ammonia, to withdraw ammonia vapors from the storage zone, compress and condense said vapors, and return the condensed ammonia to the storage zone or to anhydrous ammonia storage.

We have developed a method for storing ammonia as aqua ammonia in which recovery of ammonia vapors from the storage zone by compression and liquefaction is avoided. By the practice of our invention ammonia is stored during periods of slack demand in large tanks such as those employed for storing crude oil. The ammonia is dissolved in water so as to form a solution of up to about 40% concentration. At these concentrations the vapor pressure of the ammonia is sufficiently low that pressure storage is not required when employing the method of our invention. In our method of storing ammonia the expensive steps of compressing and liquefying ammonia vapors are avoided by a combination of absorption and refrigeration. Thus broadly speaking, our invention comprises a method for storing ammonia in aqueous solution and maintaining said stored solution by the combined processes of absorption and refrigeration. Our invention is particularly valuable when employed in connection with an ammonia producing plant and also when employed in connection with a plant wherein aqua ammonia is used as a raw material as in the manufacture of ammonium sulfate.

An object of the invention is to provide a method for storing ammonia as aqua ammonia.

Another object of the invention is to provide a method for storing ammonia as aqua ammonia at substantially atmospheric pressure.

Another object of the invention is to provide a method for recovering ammonia from gaseous streams containing the same and storing said ammonia as aqua ammonia.

Another object of the invention is to provide an integrated ammonia production, recovery and storage system.

Another object of the invention is to provide an integrated method for the production, recovery and storage of ammonia wherein excess refrigeration capacity in the ammonia producing facilities is employed in storing the ammonia as aqua ammonia.

Other aspects, objects and advantages of the invention will be apparent to those skilled in the art upon reading this disclosure.

Thus according to the invention there is provided a method for storing ammonia as aqua ammonia which comprises forming an aqueous solution of said ammonia, passing said solution to a storage zone, contacting excess ammonia vapors from said storage zone with an aqueous absorbent in an absorption zone, passing enriched absorbent to said storage zone and applying sufficient refrigeration to said storage zone to maintain a substantially constant temperature therein.

Further according to the invention there is provided an integrated method for the production, recovery and storage of ammonia which comprises contacting a gaseous ammonia containing stream, from an ammonia producing zone, with water in a first absorption zone; passing aqua ammonia from said first absorption zone to a storage zone; contacting excess ammonia vapors from said storage zone with water in a second absorption zone; and passing water containing dissolved ammonia from said second absorption zone to said first absorption zone as a portion of the water employed as absorbent therein. If desired refrigeration can be applied to said storage zone to maintain a substantially constant temperature therein.

There are several marked advantages in thus integrating production, recovery, and storage of ammonia. One of these advantages is the more efficient utilization of excess refrigeration capacity to thereby produce more ammonia. The slack season for sales of ammonia is usually from October through February, i. e., the cooler months of the year. This results in excess refrigeration capacity over that needed during the warmer months of the year. On the other hand pressure storage is usually at a premium during the cooler months due to slack sales. By utilizing the excess refrigeration in our storage method, as discussed further hereinafter, the production of ammonia can be increased and the increased amount of ammonia stored as aqua ammonia at low cost at substantially atmospheric pressure.

The amount of ammonia sold as aqua ammonia is constantly increasing due to ease of handling (as compared to anhydrous ammonia) by the consumer and others. Our invention provides a method for balancing the storage between anhydrous ammonia and aqua ammonia. Our integrated method of production, recovery and storage is particularly valuable when a plant utilizing aqua ammonia as a raw material, such as an ammonium sulfate plant, is operated in connection with the ammonia plant.

Still another advantage of our invention is the elimination of a still for recovering anhydrous ammonia from aqueous solutions of ammonia. Prior to our invention only small quantities of ammonia, recovered from vent gases etc., were stored as aqua ammonia and this ammonia was recovered and sold as anhydrous ammonia.

In one embodiment of the invention ammonia vapors from an ammonia storage zone containing aqua ammonia are passed to an absorption zone wherein they are contacted with water and the resulting aqua ammonia is transferred to the said storage zone. In another embodiment of the invention the said ammonia vapors are contacted in an absorption zone with aqua ammonia and the enriched absorbent is returned to the said storage zone. In both of said embodiments aqua ammonia is circulated from the storage zone, through a refrigeration zone, and returned to said storage zone in order to maintain a substantially constant temperature in said zone. It is preferred, although not essential, to maintain a substantially constant pressure within the storage zone in both of the described embodiments.

In a presently preferred embodiment of the invention, wherein our method of storing ammonia as aqua ammonia is employed in connection with an ammonia producing plant, gaseous ammonia containing streams from said plant are contacted in a first absorption zone with water and vapors from the ammonia storage zone are contacted with water in a second absorption zone, the resulting aqueous solution of ammonia from said second absorption zone is introduced into said first absorption zone as a part of the absorbent employed therein and the resulting aqua ammonia from said first absorption zone is then passed to the aqua ammonia storage tank. In this embodiment, as in the two previously described embodiments, aqua ammonia from the storage tank can be circulated through a refrigeration zone in an amount sufficient to maintain a substantially constant temperature in the storage zone. The amount of aqua ammonia circulated from the storage zone through said refrigeration zone will depend upon the temperature it is desired to maintain in said storage zone and the capacity of the refrigeration system. Continuous circulation may or may not be required as will be understood by those skilled in the art. Also, it is preferable, although not essential, to maintain a substantially constant pressure, substantially atmospheric, in the storage tank.

It is to be noted that in our method of storing ammonia as aqua ammonia said ammonia is stored at substantially atmospheric pressures and temperatures.

Other embodiments of the invention will be apparent to those skilled in the art in view of this discussion and upon study of the attached drawing which is a schematic flow sheet of an ammonia producing plant and storage system illustrating the above described and other embodiments of the invention.

Referring now to the drawing the invention will be more fully explained. An ammonia synthesis gas comprising nitrogen and hydrogen in a molal ratio of approximately 3 to 1 and containing gases inert to the reaction, such as argon and helium, is introduced through line 10 into an ammonia conversion zone 11 wherein it is contacted with a suitable catalyst, for example an iron oxide catalyst, under suitable ammonia producing conditions such as a temperature within the range of about 500 to 520° C. and a pressure of about 5400 p. s. i. g. It should be understood that our invention is not limited to any specific operating conditions in the ammonia synthesis plant. Our method of storing ammonia as aqua ammonia can be employed in connection with any ammonia synthesis plant or other plant wherein ammonia containing gases are scrubbed with water to recover the ammonia. Effluent from said conversion zone is passed through line 12 into a condensing zone 13 wherein the greater part of the ammonia product is condensed. Ammonia product, together with uncondensed gases, is passed through line 14 into separator 15 from where the uncondensed gases and some gaseous ammonia are withdrawn through line 16 and returned to said conversion zone as cycle gases of the process. During the operation of the process it is necessary to intermittently purge a portion of the said cycle gases from the system in order to prevent gases inert to the reaction from building up to excessive concentration in the system. Gases so purged are withdrawn through valve 17 and line 18 and are treated as described hereinafter. Liquid ammonia is withdrawn from separator 15 and passed via line 19 into flash tank 20 wherein a further purification of said liquid ammonia is effected by flash vaporization. Flashed gases containing some ammonia vapor are removed from flash tank 20 through line 21 into separator 22 wherein any liquid ammonia carried over with the vapors is separated. Liquid anhydrous ammonia is withdrawn through lines 23 and 24 to anhydrous ammonia storage 25.

In a presently preferred embodiment of the invention wherein an integrated ammonia production, recovery and storage system is provided, ammonia vapors are passed through line 26 into line 27 and together with any purged gases from line 18 are introduced into the bottom of absorber 28, wherein said gases are contacted countercurrently with a stream of water introduced through line 29. Inert gases are vented from absorber 28 through line 30. Motor valve 31 functions as a pressure reducing valve and regulator in order to introduce the gases into absorber 28 at approximately 25 to 40, preferably 30 to 35, pounds per square inch gauge. Water containing dissolved ammonia is withdrawn from absorber 28 through line 32, cooled in cooler 33 and passed via pump 34, line 35, and line 36 into aqua ammonia storage tank 37. Excess ammonia vapors from tank 37 are withdrawn through line 38 and introduced via line 39 into absorber 40 wherein said vapors are contacted countercurrently with a stream of water introduced into the top of absorber 40 through line 41. Water containing dissolved ammonia is withdrawn from the bottom of absorber 40 through line 42 and passed via pump 43, valve 44, and line 45 into absorber 28 as a portion of the water employed as absorbent in said absorber 28. As mentioned, water containing dissolved ammonia is withdrawn from absorber 28 through line 32 and passed to storage tank 37 as described. Aqua ammonia can be passed from tank 37 through lines 46 and 81 to an ammonium sulfate plant as discussed above, or through lines 46 and 82 for loading into tank cars, barges, etc. Or, if desired, aqua ammonia from tank 37 can be passed to a distillation unit (not shown) for the recovery of anhydrous ammonia.

During the operation of the just described production, recovery and storage method the aqua ammonia in tank 37 can be maintained at a substantially constant temperature, preferably within the range of from 50–70° F., by applying sufficient refrigeration to maintain said temperature. Said refrigeration is applied by withdrawing aqua ammonia through line 46 via pump 47 and passing same through line 48 and refrigeration zone 49 from where the aqua ammonia is returned via lines 50 and 36 to the said storage tank 37. The refrigeration zone 49 can comprise any convenient heat exchange means such as a shell and tube heat exchanger or a coil in a brine tank and refrigeration is supplied by means of refrigeration coil 51 which is a part of a refrigeration cycle comprising line 52, line 53, compressor 54 and condenser 55, the operation of which will be understood by those skilled in the art. The said refrigeration cycle preferably employs ammonia as a refrigerant.

As previously mentioned it is preferable that the pressure in tank 37 be maintained at a positive pressure, substantially atmospheric, in the order of approximately ¼" of water. Motor valve 56 in line 38, operatively connected to tank 37, serves to prevent the withdrawal of the vapors from the tank when the pressure decreases below a predetermined desired value and to permit the withdrawal of vapors when the pressure is above a predetermined desired value. As will be understood by those skilled in the art there will be times when the pressure in tank 37 will decrease abnormally due to large withdrawals of aqua ammonia from the tank or rapid decreases in atmospheric temperatures. In such cases provision is made for introducing additional ammonia containing gases into the vapor space of tank 37 by means of line 57 connected to purge line 18. Motor valve 58 functions as a pressure reducing valve to reduce the pressure in line 57 and motor valve 59, operatively connected to tank 37 serves to admit gases from line 57 into said tank when the pressure in said tank decreases. Thus, by the operation just described a positive pressure, substantially atmospheric, is maintained in storage tank 37 at all times.

Absorber 40 is preferably operated at approximately 12 pounds per square inch absolute and said reduced pressure is maintained by means of steam jet 60. Said steam jet serves to draw vapors from tank 37 through absorber 40 as will be understood by those skilled in the art. During periods when motor valve 56 has closed responsive to a reduced pressure in tank 37, it is desirable that the pressure in absorber 40 be maintained at approximately 12 pounds per square inch absolute. This is accomplished by admitting ammonia vapors from line 27 or line 18 via line 61 into absorber 40. Motor valve 62 operatively connected to absorber 40 opens at a predetermined decreased pressure in said absorber and permits ammonia containing gases to enter said absorber.

When it is desired to increase the concentration of the aqua ammonia in tank 37, or to store anhydrous ammonia as aqua ammonia, liquid anhydrous ammonia from storage 25 can be passed through line 63 and mixed in mixer 64 with the aqua ammonia being circulated from tank 37 through refrigeration zone 49 as described. If desired, compressor 54 can be blocked out of the refrigeration cycle by means of the valves shown and ammonia from line 63 expanded through valve 65 into coil 51 and then passed via line 66 into mixer 64 for increasing the concentration of said aqua ammonia.

The above described system represents a preferred embodiment of the invention wherein our method of storing aqua ammonia is efficiently combined with recovery of ammonia from gaseous streams in an ammonia producing plant. By passing aqua ammonia from absorber 40, which operates at a considerably lower temperature than absorber 28, into absorber 28 it is possible to substantially increase the efficiency and the amount of ammonia recovered in said absorber 28 discussed further hereinafter.

Our method of storing aqua ammonia can be employed independently of the ammonia recovery system however. For example ammonia vapors from tank 37 can be absorbed in absorber 40, aqua ammonia withdrawn through line 42 and passed via pump 43, lines 67, 68, and 36 into tank 37. The temperature and pressure in tank 37 are maintained as previously described.

In another embodiment of the invention vapors from tank 37 are passed through line 38 into absorber 69 wherein said vapors are contacted counter-currently with a circulating refrigerated stream of aqua ammonia. Said stream of circulating aqua ammonia is maintained by introducing water as needed through line 70 and controlling the concentration of the aqua ammonia absorbent by passing a portion of same via line 71, line 50, and line 36 into tank 37. Level controller 72, operatively connected to motor valve 73, maintains a constant level in the bottom of absorber 69. During operation of absorber 69, absorbent is withdrawn through line 74, circulated through refrigeration zone 49, and reintroduced into the top of said absorber by means of line 75. Unabsorbed gases from absorber 69 are withdrawn through line 76 and vented through line 77. The temperature and pressure in tank 37 can be maintained as previously described.

In another embodiment of the invention unabsorbed vapors or gases from absorber 69 can be passed through lines 76 and 78 and introduced via line 39 into absorber 40 wherein they are contacted with water for further recovery of ammonia as previously described. The water from absorber 40 containing dissolved ammonia can be passed through lines 42, 67, 68 and 36 into tank 37; or, said water can be passed through lines 42, 67, 68, 79 and 35 into absorber 69 and employed therein as the refrigerated absorbent. Thus absorbers 69 and 40 serve as a two stage absorption system for the recovery of ammonia vapors from tank 37.

In still another embodiment of the invention wherein our method of storing ammonia as aqua ammonia is integrated with an ammonia synthesis plant and the ammonia recovery system therein, aqua ammonia from absorber 28 is introduced via lines 32 and 35 into absorber 69 and serves as the absorbent therein. Said absorbent is refrigerated by circulation through refrigeration zone 49 via lines 74 and 75. A portion of the enriched absorbent is passed from line 74 via lines 71, 50, and 36 to tank 37, responsive to liquid level controller 72. In this embodiment vapors from tank 37 are contacted in absorber 69 with circulated refrigerated absorbent and unabsorbed gases from absorber 69 are passed as described above into absorber 40. The aqueous solution of ammonia from absorber 40 is then introduced into absorber 28 as previously described. Thus, this embodiment of the invention represents an ammonia synthesis system, and its ammonia recovery system, integrated with a storage method employing a two stage vapor recovery system to recover the ammonia vapor from a storage tank.

In an ammonia synthesis plant wherein the hydrogen in the synthesis gas is obtained by the pyrolysis of hydrocarbons, said synthesis gases are usually scrubbed with an ammoniacal solution of a cuprous salt to remove carbon monoxide. When the ammoniacal-cuprous salt solution is regenerated, ammonia vapors are liberated. Line 80 provides means for introducing the thus liberated ammonia, via line 61, into absorber 40 where it can be recovered.

Storage tank 37 is usually maintained at a temperature within the range of 40 to 80° F., preferably 50 to 70° F., depending upon the concentration of the aqua ammonia and the atmospheric temperature. Since ammonia is more soluble in cold water it is desirable to maintain the solution as cold as is practical. Obviously, practical limitations of refrigeration capacity relative to atmospheric temperature will determine to a large extent the temperature maintained in tank 37.

The pressure on storage tank 37 is maintained within the range of atmospheric to one-half inch of water, preferably about one-fourth inch of water. It is desirable to keep a positive pressure on said tank at all times in order to avoid danger of the tank collapsing. Pressures higher than one-half inch of water increase installation costs.

Absorber 40 is usually operated at a pressure within the range of 10-14 pounds per square inch absolute, preferably at approximately 12 pounds p. s. i. a. The average temperature within said absorber is maintained within the range of 50-75° F., preferably within the range of 60-65° F. by cooling the water introduced through line 41 to about 50° F. and by the use of intercoolers, not shown in the drawing. The water introduced through line 41 is introduced at a rate proportional to the amount of gas being introduced through lines 39 and 61. The rate of introduction of said water is controlled by a ratio controller (not shown) operatively connected to lines 41 and 39 proportional to the amount of gas introduced through line 39 and the concentration of ammonia in said gas. Enough water is used to reduce the concentration of ammonia in said gas from about 80 to 100 percent by volume, usually about 90 percent, to the extent that the gases leaving said absorber through ejector 60 will contain from 10 to 30 percent by volume, normally 18 to 20 percent, ammonia. If desired the gases from ejector 60 through line 83 can be compressed and introduced, via a line not shown, into absorber 28 for further recovery of ammonia from said gases. The concentration of ammonia in the water leaving said absorber through line 42 is between 10 and 30 percent by weight, usually between 15 and 20 percent by weight.

Absorber 28 is usually operated at a pressure within the range of 25–40 pounds per square inch gauge, preferably within the range of 30–35 p. s. i. g. The top temperature in said absorber is maintained within the range of 75 to 125° F., preferably within the range of 75–85° F. by cooling the water introduced through line 29 to about 50° F. The bottom temperature in said absorber is maintained within the range of 120–140° F., preferably within the range of 120–125° F. The amount of water introduced through line 29 is controlled by means of a ratio controller, operatively connected to lines 29 and 27, proportional to the amount of gas introduced into said absorber through line 27 and the concentration of ammonia in said gas.

In the previously discussed preferred embodiment of the invention aqua ammonia from the bottom of absorber 40 is introduced into absorber 28 at about the midpoint thereof. It will be noted that absorber 40 operates at an appreciably lower temperature than absorber 28. Thus the introduction of the cooler stream of water from absorber 40 into the midpoint of absorber 28 lowers the temperature of the bottom portion of absorber 28 and results in a marked increase in the efficiency of absorber 28. When absorber 28 is operated without the introduction of aqua ammonia from the bottom of absorber 40, the bottom temperature of absorber 28 will usually run between 100–140° F. and the concentration of ammonia in the aqua ammonia from 15 to 35, preferably 25 to 30 percent by weight; whereas with the introduction of the aqua ammonia from absorber 40 said bottom temperature is usually within the range of 120–125° F. and the concentration of ammonia in the aqua ammonia withdrawn through line 32 will range from 25 to 50, preferably 30 and 35 percent by weight. Thus, the lowering of the temperature on the outlet of absorber 28 results in an increase in concentration of the aqua ammonia therefrom of from 5–10% in the preferred and usual operation. The concentration of ammonia in the gases introduced into absorber 28 ranges from 40 to 70 percent by volume, usually between 50 to 60 percent by volume. Sufficient absorbent is employed in said absorber to reduce the concentration of ammonia in the gases in line 30 to within the range of 0 to 0.5 percent by volume, normally about 0.2 percent by volume. A further advantage in the introduction of aqua ammonia from absorber 40 into absorber 28 as described, is a decrease in the amount of fresh water required to be introduced through line 29. This results in an appreciable monetary savings. Thus it is seen there are marked advantages to the introduction of the aqua ammonia from absorber 40 through absorber 28.

Absorber 69 is usually operated at a pressure within the range of 12–15 pounds p. s. i. g., preferably within the range of 13–14 pounds p. s. i. g. The temperature of the refrigerated absorbent circulated through said absorber is maintained within the range of 50–70° F., preferably 55–65° F. The concentration of said ammonia in said absorbent is usually maintained within the range of 25–40%, preferably within the range of 25–30% ammonia.

An added feature of the invention which can be employed in all of the above described embodiments is maintaining a layer of an immiscible liquid on the surface of the aqua ammonia in tank 37. In an "open" system, i. e., a system that is open to the atmosphere, the use of such a layer of an immiscible liquid makes it more difficult for the ammonia to escape from solution and enter the vapor space above said solution. In an open system the ammonia which escapes from solution and enters the vapor space is, of course, lost. In a "closed" system, such as the one herein described, wherein a substantially constant pressure is maintained in the storage tank at all times, the layer of immiscible liquid aids in at least two ways (1) by decreasing the rate of escape of ammonia from the solution into the vapor space and (2) by also decreasing the rate of solution of ammonia from the vapor space into the aqua ammonia solution. This latter advantage is more important than it appears to be upon first consideration. By decreasing the rate of solution of ammonia vapor from the vapor space into the aqua ammonia, fluctuations in the amount of ammonia in said vapor space due to changes in temperature and/or withdrawal of solution from the tank are decreased. Thus there is much less danger of the storage tank collapsing due to decreased pressure resulting from absorption of ammonia vapors or withdrawal of aqua ammonia from the tank. Decreasing the fluctuation of the amount of ammonia vapor from said vapor space is also advantageous in that any ammonia which is introduced into said vapor space to maintain the substantially constant pressure therein must be withdrawn and absorbed eventually.

Any liquid having a low volatility, which is immiscible with an aqueous solution of ammonia, which is chemically inert toward ammonia under the conditions of use, and in which ammonia is substantially insoluble, is a suitable immiscible liquid. Liquids having a high surface tension are generally preferred because such liquids afford greater resistance to the passage of "bubbles" of ammonia gas through the liquid. Suitable immiscible liquids are hydrocarbons; petroleum fractions such as heavy naphthas, kerosenes, gas oils, and lubricating oils; ethers; alcohols and other liquids having the above described properties. A presently preferred immiscible liquid is a mineral lubricating oil of a SAE 30 grade or higher. Usually a layer of said immiscible liquid about 1 to 6 inches thick is employed in the storage tank.

While only one storage tank has been shown in the drawing it should be understood that any number of storage tanks properly manifolded together in parallel can be employed. It is usually desirable, although not necessary, to insulate said storage tanks.

Likewise while only one absorber has been shown for each of the services in which absorbers 28, 40 and 69 are employed it should be realized that additional absorbers properly manifolded in parallel can be employed in each service.

As will be evident to those skilled in the art various modifications of the invention can be made, or followed, in light of the above disclosure without departing from the spirit or scope of said disclosure.

We claim:

1. A method for storing ammonia as aqua ammonia at substantially atmospheric pressure which comprises forming an aqueous solution of said ammonia, passing said solution to a storage zone, contacting excess ammonia vapors from said storage zone with an aqueous absorbent in an absorption zone, passing enriched absorbent to said storage zone and circulating aqua ammonia from said storage zone to and through a refrigeration zone and then returning said aqua ammonia to said storage zone so as to maintain a predetermined temperature in said storage zone.

2. The method of claim 1 wherein said aqueous absorbent is water.

3. The method of claim 1 wherein said aqueous absorbent is an aqueous solution of ammonia.

4. The method of claim 3 wherein refrigeration is applied to said aqueous solution of ammonia.

5. A method according to claim 1 wherein a layer of

9 a liquid immiscible with said aqua ammonia is maintained on the surface of said aqua ammonia in said storage zone.

6. A method for the storage of aqua ammonia in a storage zone at substantially atmospheric pressure, which method comprises, circulating aqua ammonia from said storage zone to and through a refrigeration zone and then returning said aqua ammonia to said storage zone so as to maintain a substantially constant predetermined temperature in said storage zone, contacting excess ammonia vapors from said storage zone with an aqueous absorbent in an absorption zone, and passing enriched absorbent from said absorption zone to said storage zone.

7. In a process for the production of ammonia wherein a gaseous ammonia containing stream is contacted with water to recover said ammonia and the resulting aqua ammonia is stored as such, the improved method of recovering and storing said ammonia at substantially atmospheric pressure, which comprises: introducing said gaseous ammonia containing stream into the lower portion of a first absorption zone; introducing a first stream of water into the upper portion of said first absorption zone; withdrawing unabsorbed gases from the top portion of said first absorption zone; withdrawing resulting aqua ammonia from the bottom portion of said first absorption zone and passing same to a storage zone maintained at substantially atmospheric pressure; introducing ammonia vapors from said storage zone into the lower portion of a second absorption zone operated at a lower temperature than said first absorption zone; introducing a second stream of water into the upper portion of said second absorption zone; withdrawing unabsorbed gases from the top portion of said second absorption zone; withdrawing water containing dissolved ammonia from the bottom portion of said second absorption zone and introducing same into said first absorption zone at a point intermediate the points of introduction of said gaseous ammonia containing stream and said first stream of water so as to cool the lower portion of said first absorption zone; maintaining the upper portion of said first absorption zone at a temperature within the range of 75 to 85° F.; maintaining the lower portion of said first absorption zone at a temperature within the range of 120 to 125° F.; and circulating aqua ammonia from said storage zone to and through a refrigeration zone and then returning said aqua ammonia to said storage zone so as to maintain said storage zone at a temperature within the range of 40 to 80° F.

8. A method for the storage of aqua ammonia in a storage zone at substantially atmospheric pressure, which method comprises: circulating aqua ammonia from said storage zone to and through a refrigeration zone and then returning said aqueous ammonia to said storage zone so as to maintain a predetermined temperature in said storage zone; contacting excess ammonia vapors from said storage zone with an aqua ammonia absorbent in a first absorption zone; contacting residual ammonia vapors from said first absorption zone with water in a second absorption zone; and passing enriched absorbent from each of said absorption zones to said storage zone.

9. A method according to claim 8 wherein said aqua ammonia absorbent employed in said first absorption zone is a refrigerated circulating stream the concentration of which is maintained within predetermined limits by the addition of water as needed.

10. A method for the storage of aqua ammonia in a storage zone at substantially atmospheric pressure, which method comprises: circulating aqueous ammonia from said storage zone through a refrigeration zone so as to maintain a predetermined temperature in said storage zone; contacting excess ammonia vapors from said storage zone with an aqua ammonia absorbent in a first absorption zone; contacting residual ammonia vapors from said first absorption zone with water in a second absorption zone; passing water containing dissolved ammonia from said second absorption zone to said first absorption zone as said aqua ammonia absorbent; and passing enriched absorbent from said first absorption zone to said storage zone.

11. A method for storing ammonia as aqua ammonia in a storage zone at substantially atmospheric pressure, which method comprises: contacting a gaseous ammonia containing stream with water in a first absorption zone; passing aqua ammonia from said first absorption zone to said storage zone; contacting excess ammonia vapors from said storage zone with water in a second absorption zone operated at a lower temperature than said first absorption zone; and passing water containing dissolved ammonia from said second absorption zone to an intermediate point in said first absorption zone as a portion of said water employed as absorbent therein so as to cool the lower portion of said first absorption zone.

12. The method of claim 11 wherein said first absorption zone is operated at a temperature within the range of 75 to 140° F., and under a pressure of from 25 to 40 pounds per square inch gauge and said second absorption zone is operated at a temperature within the range of 50 to 75° F. and under a pressure of from 10 to 14 pounds per square inch absolute.

13. A method according to claim 11 wherein a layer of a liquid, immiscible with said aqua ammonia is maintained on the surface of said aqua ammonia in said storage zone.

14. A method for recovering ammonia and maintaining an aqueous solution of ammonia in a storage zone at substantially atmospheric pressure which comprises: contacting a gaseous ammonia containing stream with water in a first absorption zone; contacting excess ammonia vapors from said storage zone in a second absorption zone with an aqueous solution of ammonia from said first absorption zone; contacting residual ammonia vapors from said second absorption zone with water in a third absorption zone operated at a lower temperature than said first absorption zone; passing water containing dissolved ammonia from said third absorption zone to an intermediate point in said first absorption zone as a portion of said water employed as absorbent therein so as to cool the lower portion of said first absorption zone; and passing an enriched aqueous solution of ammonia from said second absorption zone to said storage zone.

15. The method of claim 14 wherein said first absorption zone is operated at a temperature within the range of 75 to 140° F. and under a pressure of from 25 to 40 pounds per square inch gauge, said second absorption zone is operated at a temperature within the range of 50 to 70° F. and under a pressure of 12 to 15 pounds per square inch gauge, and said third absorption zone is operated at a temperature within the range of 50 to 75° F. and under a pressure of 10 to 14 pounds per square inch absolute.

16. In a process for the production of ammonia wherein a gaseous ammonia containing stream is contacted with water to recover said ammonia and the resulting aqua ammonia is stored as such, the improved method of recovering and storing said ammonia at substantially atmospheric pressure which comprises: contacting said gaseous ammonia containing stream with water in a first absorption zone; passing resulting aqua ammonia from said first absorption zone to a storage zone maintained at substantially atmospheric pressure; contacting excess ammonia vapors from said storage zone with water in a second absorption zone operated at a lower temperature than said first absorption zone; passing water containing dissolved ammonia from said second absorption zone to an intermediate point in said first absorption zone as a portion of said water employed as absorbent therein so as to cool the lower portion of said first absorption zone; and circulating aqua ammonia from said storage zone to and through a refrigeration zone and then returning said aqua ammonia to said storage zone so as to maintain said substantially constant temperature in said storage zone.

17. The method of claim 16 wherein said first absorption zone is operated at a temperature within the range of 75 to 140° F. and under a pressure of 25 to 40 pounds per square inch gauge and said second absorption zone is operated at a temperature within the range of 50 to 75° F. and under a pressure of from 10 to 14 pounds per square inch absolute.

References Cited in the file of this patent

UNITED STATES PATENTS

| | | |
|---|---|---|
| 1,074,747 | Rowe | Oct. 7, 1913 |
| 1,216,059 | Bosch | Feb. 13, 1917 |
| 1,333,029 | MacIntyre | Mar. 9, 1920 |
| 1,679,792 | Slade et al. | Aug. 7, 1928 |